United States Patent [19]
Hutchinson et al.

[11] 3,724,574
[45] Apr. 3, 1973

[54] WEIGHING AND HEIGHT MEASURING DEVICE

[75] Inventors: William Y. Hutchinson, Chicago; Walter P. Kushmuk, Niles, both of Ill.

[73] Assignee: Continental Scale Corporation, Chicago, Ill.

[22] Filed: Dec. 13, 1971

[21] Appl. No.: 207,329

Related U.S. Application Data

[62] Division of Ser. No. 83,924, Oct. 26, 1970, Pat. No. 3,667,561.

[52] U.S. Cl. ............... 177/210, 177/225, 177/245
[51] Int. Cl. ......... G01g 3/02, G01g 7/02, G01g 19/50
[58] Field of Search....177/1, 50, 210, 211, 246, 245, 177/225, 168–170; 73/432 R; 33/169 R

[56] References Cited

UNITED STATES PATENTS

| | | |
|---|---|---|
| 1,806,741 | 5/1931 | Cameron...........................177/225 |
| 2,236,158 | 3/1941 | Rockefeller......................177/225 |
| 2,653,475 | 9/1953 | Kraus..............................177/211 |
| 2,836,980 | 6/1958 | Jiepen.............................177/245 |
| 3,027,761 | 4/1962 | Lauro..............................177/245 |
| 3,616,690 | 11/1971 | Harden............................177/211 |

FOREIGN PATENTS OR APPLICATIONS

| | | |
|---|---|---|
| 1,032,826 | 6/1966 | Great Britain....................177/210 |

*Primary Examiner*—Richard B. Wilkinson
*Assistant Examiner*—R. S. Ward
*Attorney*—Richard L. Johnston

[57] ABSTRACT

A device for measuring weight and/or height especially adapted for use with a remote digital read-out system comprising a mechanical leverage weighing structure having a high degree of sensitivity and low friction and hysteresis coupled with a compatible electronic measuring system and/or a height measuring means compatible with said system.

6 Claims, 2 Drawing Figures

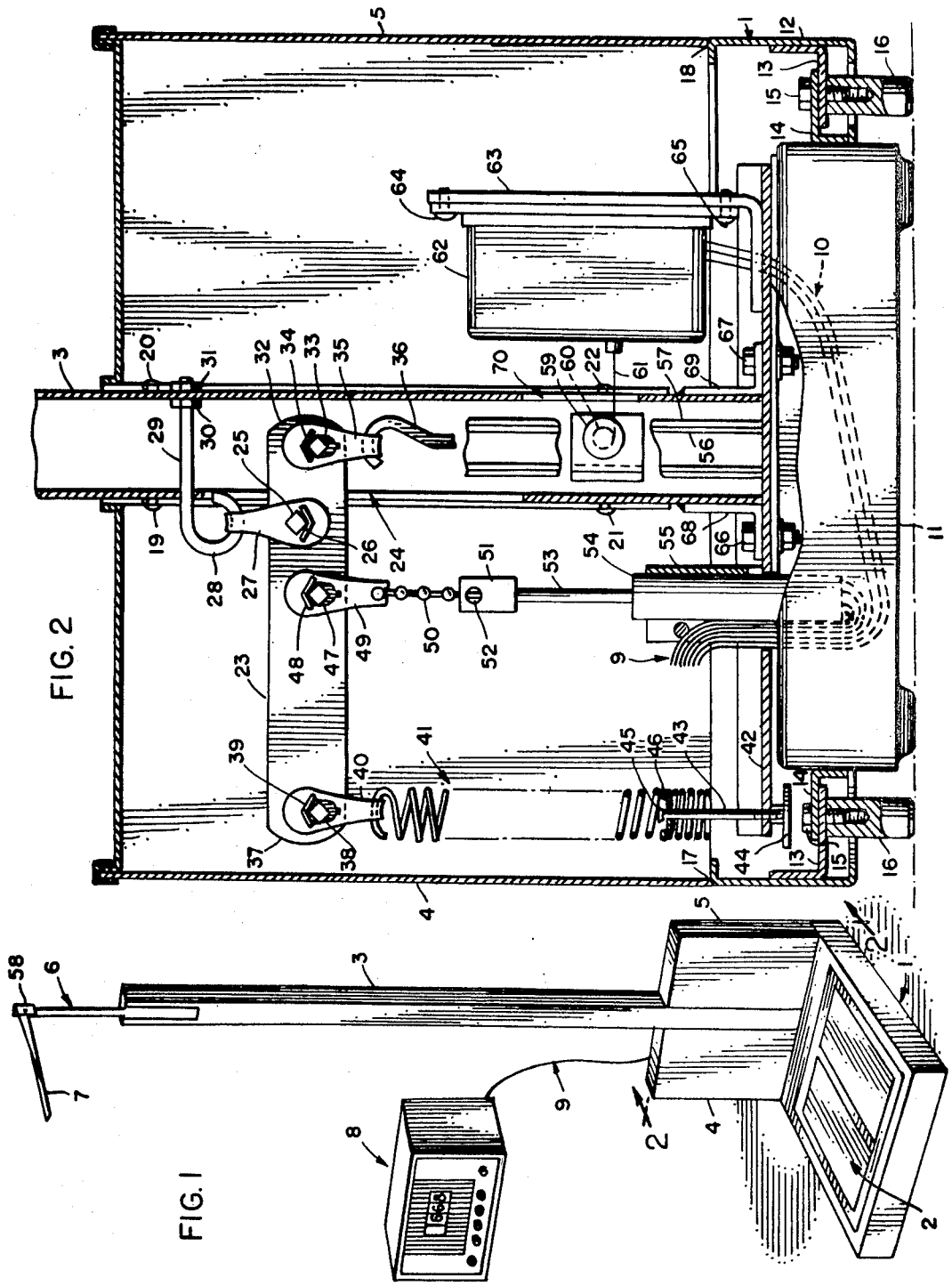

WEIGHING AND HEIGHT MEASURING DEVICE

This is a Division of application Ser. No. 83,924 filed Oct. 26, 1970 now U.S. Pat. No. 3,667,561, issued June 6, 1972.

BACKGROUND OF THE INVENTION

Many different weighing devices and height measuring devices have heretofore been proposed. The usual type of weighing scale consists of a weighing platform and a series of levers or a spring arranged so that the person being weighed can view a scale showing his weight. Height measurement is usually obtained by manually adjusting the height measuring rod. Most of these devices are relatively simple. Others are fairly complex depending upon the accuracy required and the conditions.

In recent years various types of weighing systems have been proposed which involve the use of differential transformers. Examples of such systems are those disclosed in U.S. Pat. Nos. 2,610,052, 2,801,874 and 3,182,495. In general, these may be described as electronic systems although they normally have a number of mechanical features.

It would be desirable to provide a highly accurate mechanical weighing system and/or height measuring system which is compact and compatible with an electronic system so that the measurements can be read either integrally or remotely from the point where they are taken, and/or fed to a computer.

OBJECTS

One of the objects of this invention is to provide a new and improved device for measuring weight and/or height adapted for use either integrally or with a remote digital read-out system and/or a computer input signal comprising a mechanical leverage weighing system having a high degree of sensitivity and low friction and hysteresis coupled with a compatible electronic measuring system and/or a height measuring means compatible with said system.

Another object of the invention is to provide a new and improved compact weight and height measuring apparatus which is especially adapted for use in hospitals and medical centers and for use with other types of examination equipment normally employed in hospitals and medical centers.

Other objects and advantages of the invention will appear from the following description in conjunction with the accompanying drawings.

BRIEF DESCRIPTION OF THE DRAWINGS

In the drawings,

FIG. 1 is a perspective view illustrating one embodiment of the invention; and

FIG. 2 is an elevational sectional view taken along lead line 2—2 of FIG. 1.

BRIEF SUMMARY OF THE INVENTION

In accordance with the invention a weight and height measuring apparatus is provided comprising in combination a base, a weight responsive movable platform mounted on said base, a hollow pillar mounted on said base and having openings in the sides thereof, a first housing on one side of said pillar providing an enclosed space communicating with one of said openings in said pillar, a second housing on another side of said pillar providing an enclosed space communicating with another of said openings in said pillar, weighing mechanism in said first housing connected through one said opening in said pillar to said platform, and height measuring means in said pillar and said second housing and extending through another said opening in said pillar.

The apparatus is further characterized by the fact that said first housing encloses a variable inductance transducer which generates a signal in response to weight on said platform and said second housing encloses a variable resistance transducer which generates a signal in response to height as measured by said height measuring means.

The mechanical structure of the weighing apparatus is also an important feature of the invention in that it provides a high degree of sensitivity together with low friction and hysteresis and is compatible with an electronic measuring system.

DETAILED DESCRIPTION OF THE INVENTION

Referring to FIG. 1 of the drawings, the apparatus illustrated comprises a base generally indicated at 1, a weight responsive moving platform generally indicated at 2, a hollow pillar 3 which is mounted and affixed to said base, a first housing 4 on one side of said pillar providing an enclosed space, a second housing 5 on the opposite side of said pillar providing an enclosed space, a height measuring rod generally indicated at 6 which is provided with a projecting portion 7 adapted to be placed on the head of the person whose height is being measured, and a digital read-out unit generally indicated at 8 where both weight measurements and height measurements can be read directly in terms of pounds or kilograms and inches or centimeters. The read-out unit 8 is connected to the output connector in the base 1 by a cable generally indicated at 9 which includes connections 10 from the unit in housing 5 as well as those from the unit in housing 4.

In FIG. 2 the base 1 consists of an inner base 11 and an outer base 12. The outer base 12 is connected to the inner base 11 by means of brackets 13,13, 14,14, and machine screws 15,15. The brackets 13,13 are secured to the inner wall of the outer base 12 by welding or in any other suitable manner, the brackets 14,14 are secured to the outer wall of the inner base 11 by welding or in any other suitable manner, and the brackets 13,13 and 14,14 are screwed together by machine screws 15,15 which are also connected to the feet 16,16. The latter are adapted to rest on the floor or other surface and to assist in preventing tilting of the apparatus.

The housings 4 and 5 rest on the upper surfaces of the outer base at points 17 and 18 and are secured to the outer walls of the pillar 3 by means of bolts 19, 20, 21 and 22 which are adapted to receive keyhole openings on the inner sides of the housings 4 and 5 so that the housings 4 and 5 can be removed by lifting them upwardly and pulling outwardly.

The weighing system comprises a beam 23 extending in a generally horizontal direction through an opening 24 in the pillar 3. Beam 23 is supported adjacent the pillar 3 from a knife edge pivot 25 in contact with a V- bearing 26 which is affixed to a beam loop 27 disposed over a pillar hook 28. An arm 29 of the pillar hook 28 is threaded at one end and fastened to pillar 3 by nuts 30,31.

The end 32 of beam 23 is connected by knife edge pivot 33, V-bearing 34 and beam loop 35 to steel yard hook 36 which in turn is connected to the platform and its associated mechanism so that hook 36 moves in response to and acts as a transmission means for any weight imparted to the platform 2 and its associated mechanism. The platform 2 and its associated mechanism are conventional. Hence, no detailed description is necessary. For the sake of clarity the platform 2 is not shown in FIG. 2 but if shown it would occupy a position approximately corresponding to a line through the top side of the outer base.

The outer end 37 of beam 23 is connected through knife edge pivot 38, V-bearing and 39 and beam loop 40 to the upper end of main spring 41 which, as shown, is a coil spring. The lower end of main spring 41 is secured to plate 42 by an adjusting rod 43 which is threaded to receive rotatable knob 44. The upper end 45 of adjusting rod 43 is flanged and affixed to a member 46 disposed between the lower coils of spring 41. This arrangement constitutes a means for adjusting the weighing mechanism to a zero position. By turning knob 44 the members 43 and 46 move axially. When the member 46 is rotated clockwise the length of spring 41 is increased, thereby increasing the tension. When member 40 is rotated in the opposite direction the length of spring 41 is decreased thereby reducing the tension. Initial calibration of the mechanical system can be achieved by rotating the adjusting rod 43 which rotates members 46 in the coils of spring 41, thereby changing the number of effective coils which changes the spring rate accordingly.

At a point intermediate between pivot 25 and pivot 38 knife edge pivot 47, V-bearing 48 and beam loop 49 connect beam 23 to beaded chain 50 which serves as a floating connection to plunger sleeve 51, the latter being connected to beaded chain 50 by means of set screw 52. Plunger sleeve 51 is threaded at one end and secured to plunger rod 53 which is also threaded in order to provide the connection. Plunger rod 53 at its lower end is the core of linear variable differential transformer 54. Transformer 54 is held in place by holder 55 which is connected to base 11. The voltage output of transformer 54 is transmitted by means of wires 9 to the read-out unit 8 shown in FIG. 1.

The measuring rod assembly consists of two telescoping members 56 and 57 disposed within pillar 3 in the front portion thereof. One of these is normally fastened to the base 11 and the other one is movable vertically to any height corresponding to the height of the person to be measured. The ultimate height usually does not exceed 8 feet. It will be understood that member 7 is pivoted at 58 so that it can be moved from a vertical to a horizontal position or vice versa. A pulley 59 is mounted for rotation on a stud 60, the latter being affixed to the front side of pillar 3. A wire 61 which is usually 5 or 6 feet in length and which normally serves as a winding in the height transducer 62 passes around pulley 59 and is fastened adjacent one end of the rod 56 so that when the rod 56 is raised or lowered the wire 61 will be correspondingly moved out or into height transducer 62.

Height transducer 62 in the embodiment shown is a variable resistance transducer, viz., a multiturn potentiometer, which is connected by means of wires 10 (FIG. 1) to the digital read-out unit 8. Height transducer 62 is fastened to bracket 63 by meachine screws 64,65 or in any other suitable manner and bracket 63 is welded or otherwise fastened to the top member 42 of inner base assembly 11.

Pillar 3 is also fastened by means of bolts 66 and 67 and brackets 68 and 69 to the top member 42 of base 11. The brackets 68 and 69 are welded or otherwise secured to pillar 3.

MODE OF OPERATION

When an object or person to be weighed is placed on the platform 2 the steel yard hook 36 is drawn downwardly causing the beam 23 to be pulled downwardly at end 32 on pivot 33 and around supporting pivot 25 and its associated V-bearing 26. This causes rod 53 to be raised. Since rod 53 serves as a core of differential transformer 54 raising the rod 53 will alter the output of said transformer a predetermined amount depending upon the distance the rod is raised. In the embodiment shown, pivots 33 and 47 are equally spaced from pivot 25 and the ratio of the distance to pivot 38 is such that when pivot 38 passes through a vertical distance of two inches pivots 47 and 33 will pass through a vertical distance of 0.5 inch. Because of this arrangement, it is possible to practice the invention so as to provide a working range with or without passing through the null point of the transformer.

The apparatus is sensitive to a weight of ten grams. The leverage ratio in the platform is 10:1. The beam ratio is 4:1. When the apparatus is used for weighing persons the maximum weight limit is usually taken to be 400 pounds. The linear variable differential transformer 54 can be standard piece of equipment, for example, a differential transformer with a 6 volt DC input and a 1.8 volt DC output. Where it is desired to use the apparatus on an alternating current circuit the usual rectifiers and voltage reducers can be employed. It will be apparent that under the arrangement described 0.00125 inch movement of rod 53 corresponds to a differential of 1 pound in weight. Since the output of the transformer 54 is 1.8 volts each pound on the weight scale corresponds to 1/400 of 1.8. By transmitting the output voltage to the digital read-out unit 8 the weight measurement can be read on a numerical basis by using a conventional digital unit. In the present case this unit is modified in a conventional manner to read either pounds or kilograms simply by pressing a pushbutton on the front of the unit.

It will be recognized that other types of variable inductance transducers as well as variable resistance transducers can be used instead of a linear variable differential transformer. Also other modifications can be made in the read-out unit, for example, the read-out unit can be made so that nothing shows in the window thereof until a button is pushed. The read-out unit can also hold the last reading. Likewise it can have an electronic zero control. It will be understood, of course, that the invention is not limited to units of any particular voltage.

The height measuring unit also makes it possible to use a conventional type digital voltmeter in the read-out unit and the read-out unit is preferably adjusted so that the height can be read either in inches or centimeters.

An apparatus of the type described has a number of advantages. The deflection of the beam 23 is relatively large, the stresses on the spring wire 41 are relatively low. Usually only 20 percent of the capability of the spring is employed. This reduces the friction on the knife head and also makes it possible to work well below the yield point of the spring. Since the spring is relatively long there is more sensitivity on the pivots. The mechanical zero adjustment of the spring changes the tension and the floating suspension 50 permits accurate movement of rod 53. At the same time the apparatus is quite compact. The opening 70 through which wire 61 passes is adjacent the front of pillar 3 so that the height measuring device does not interfere with the weight measuring mechanism which is positioned toward the rear of pillar 3.

With respect to the height measuring device, it will be understood that other types of variable resistance units can be employed. It will also be understood that the number of turns of wire within the unit can be varied and that the read-out unit can be adjusted in accordance with the requirements of the particular resistance unit.

It will be recognized that the invention makes is possible to adjust the tension on spring 41 as well as the rate of the spring, i.e., the value per unit deflection.

While the structure shown embodies two separate housings, they can be combined in a single housing. In either case a multiplicity of parameters, e.g., weight in pounds and/or kilograms and height in inches and/or centimeters can be read on a single digital read-out unit.

The invention is hereby claimed: As follows:

1. In a weighing apparatus, the combination of a beam extending in a generally horizontal direction, beam supporting means for supporting said beam pivotally intermediate its ends, means for pivotally connecting one end of said beam to a platform for supporting an object to be weighed, means for pivotally connecting the other end of said beam to a spring adapted to resist a pull on the opposite end of said beam, and transducer operating means pivotally connected to said beam intermediately of said spring and said beam supporting means whereby movement of said transducer operating means alters the output from said transducer and makes it possible to record weight in response to said output.

2. An apparatus as claimed in claim 1 in which said spring is a coil spring.

3. An apparatus as claimed in claim 1 comprising means for adjusting the tension on said spring.

4. An apparatus as claimed in claim 1 comprising means for adjusting the rate of said spring.

5. An apparatus as claimed in claim 1 in which said pivotally connecting means and said supporting means each comprises knife edge pivots and V-bearings.

6. A weighing apparatus comprising a base, platform means mounted for yielding vertical movement on said base, a hollow pillar vertically mounted on said base adjacent said platform, transmitting means vertically movable in said pillar connected to said platform so that vertical movement of said platform responsive to a weight placed thereon transmits vertical movement to said transmitting means, a multilever assembly comprising a beam extending in a generally horizontal direction from said pillar, said pillar having an opening therein receiving one end of said beam, means connecting said transmitting means to said end of said beam within said pillar, beam supporting means adjacent said pillar for pivotally supporting said beam to permit pivotal vertical movement of said beam, a vertically disposed spring pivotally mounted adjacent to the opposite end of said beam to resist the pull of said transmitting means, the opposite end of said spring being connected to said base, a variable inductance electrical transducer supported from said base intermediate said beam supporting means and said spring, and vertically movable means pivotally connecting said transducer to said beam at a point intermediate said beam supporting means and said pivotal mounting of said spring whereby the movement of said last mentioned vertically movable means in response to the movement of said beam alters the output of said transducer.

* * * * *